United States Patent
Bax

(10) Patent No.: US 6,850,873 B1
(45) Date of Patent: Feb. 1, 2005

(54) USING VALIDATION BY INFERENCE TO SELECT A HYPOTHESIS FUNCTION

(76) Inventor: Eric T Bax, P.O. Box 60543, Pasadena, CA (US) 91116-6543

( * ) Notice: Subject to any disclaimer, the term of this patent is extended or adjusted under 35 U.S.C. 154(b) by 855 days.

(21) Appl. No.: 09/740,188

(22) Filed: Dec. 18, 2000

Related U.S. Application Data

(60) Provisional application No. 60/171,806, filed on Dec. 22, 1999, and provisional application No. 60/156,676, filed on Sep. 29, 1999.

(51) Int. Cl.$^7$ .............................................. G06F 17/10
(52) U.S. Cl. ................. 703/2; 700/51; 700/91
(58) Field of Search ............................. 703/2; 704/240; 700/91, 51; 705/7

(56) References Cited

U.S. PATENT DOCUMENTS 6,038,344 A * 3/2000 Palmadesso et al. ........ 382/191
6,269,506 B1 * 8/2001 Hollatz et al. ................. 8/158
6,300,958 B1 * 10/2001 Mallet ......................... 345/442
6,301,693 B1 * 10/2001 Naylor et al. ................. 716/10

* cited by examiner

Primary Examiner—Albert W. Paladini

(57) ABSTRACT

Given a set of basis functions, a set of example inputs, and a set of uniform error bounds for the basis functions over the example inputs, a quadratic program is formed. The quadratic program is solved, producing a solution vector and a solution value. A hypothesis function is formed through fusion by using the solution vector to weight the outputs of the basis function. The hypothesis function is a function with minimum error bound among the functions formed by convex combination of basis function outputs. The solution value is an error bound for the hypothesis function. The error bound is logically implied by the uniform error bounds over the basis functions rather than uniform error bounds over the entire class of functions formed by convex combination of basis function outputs.

4 Claims, 1 Drawing Sheet

USING VALIDATION BY INFERENCE TO SELECT A HYPOTHESIS FUNCTION

CROSS-REFERENCE TO RELATED APPLICATIONS

This invention relates to Provisional Application Ser. No. 60/171,806, filed Dec. 22, 1999. The contents of the application are incorporated by reference. This application also references Provisional Application Ser. No. 60/156,676, filed Sep. 29, 1999.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Function approximation is a term applied to a process of producing a rule that can be used by a computer to figure out what to do when it meets a new set of circumstances. For example, function approximation may be used to evaluate the credit risk of credit card applicants. In this case, the function that we wish to approximate, called the target function, relates information about a credit card applicant to the most profitable credit limit for the credit card issuer. The exact form of this target function is not known to us, so we must approximate it with a hypothesis function, which a computer can use to set credit limits for applicants. If the hypothesis function is a good approximation of the target function, then the computer will produce credit limits that lead to good profits.

For another example, function approximation may be used to aid medical decisions. In this case, the target function may relate medical test results and other patient data to the fraction of a tumor that will be destroyed if a given treatment is used. If we can use function approximation to develop a hypothesis function that closely resembles the target function, then a computer system can aid the decision regarding which type of treatment a doctor and patient should choose.

For another example, function approximation may be used to develop a vehicle that drives itself. In this case, the target function may relate images from video cameras mounted on the vehicle to the brake pressure that should be applied for safe driving. A hypothesis function that closely approximates the target function could be implemented in a computer system onboard the vehicle.

In each of these examples, it is important to develop a hypothesis function that closely approximates the target function. It is also important to evaluate how well the developed hypothesis function approximates the target function. This evaluation is called validation.

Fusion is a method of function approximation in which multiple functions, called basis functions, are combined to develop a hypothesis function. Fusion is useful because it can combine a variety of development efforts, with a variety of strengths, to form a single hypothesis function. The invention described here is a process to produce a hypothesis function through fusion and to validate the hypothesis function.

In function approximation, there is a target function that we do not know how to compute, and there is a distribution over the input space of the target function. For example, the input distribution could consist of images produced by a video camera mounted in a car, and the target function could be the brake pressure applied by a safe driver in response to the situation depicted in each image.

We have a set of in-sample examples with inputs drawn according to the input distribution and outputs determined by the target function. We also have a set of out-of-sample inputs drawn according to the input distribution. In the braking example, in-sample examples could be collected by recording video images and the corresponding brake pressure while a human drives the car. Out-of-sample inputs could be collected by recording video images under a variety of driving conditions.

The primary goal of function approximation is to use the in-sample examples to develop a hypothesis function that closely approximates the target function over out-of-sample inputs. The capability of a hypothesis function to closely approximate the target function over inputs not used to develop the hypothesis function is called generalization. In the braking example, the hypothesis function could be implemented by a computer system that receives video input and produces an output signal that communicates the desired brake pressure to a brake actuator. The goal is to use the in-sample examples to develop a computer system that mimics a safe human driver under a variety of conditions.

Another goal is to evaluate how well the hypothesis function generalizes, i.e., how well the hypothesis function approximates the target function over the out-of-sample inputs. The process of evaluating generalization is called validation. In the braking example, we wish to evaluate how well the computerized system mimics a safe human driver. This information allows us to either judge the system unsafe or deploy it with confidence.

Fusion is one method to develop a hypothesis function for function approximation. In fusion, the in-sample data are used to develop basis functions. Then a mixing function is developed. The mixing function combines the outputs of the basis functions into a single output to form the hypothesis function. In the braking example, several research groups can use different methods to develop different systems to control braking. These systems implement basis functions. Then another research group can develop a system that combines the outputs of the other systems into a single output. The system that combines outputs implements the mixing function. The combined systems implement the hypothesis function formed by fusion.

Now we describe prior art. There are many prior methods to develop a hypothesis function through fusion of basis function outputs. For these methods, computing an error bound for the hypothesis function entails a tradeoff between generalization and validation, as follows.

One prior method to validate the hypothesis function formed by fusion is to withhold some in-sample data from the development of the hypothesis function, then use the performance of the hypothesis function on the withheld data to compute an error bound. This method has the disadvantage that the withheld data are not used to develop the hypothesis function. As a result, the hypothesis function formed by this method is generally a worse approximation of the target function than a hypothesis function developed using all in-sample data. So generalization, which is the primary goal of function approximation, tends to suffer under this method.

Another prior method to validate the hypothesis function formed by fusion is to use all in-sample data in all steps of developing the hypothesis function, then use the performance of the hypothesis function over the in-sample data to compute an error bound. In this case, the in-sample data are not independent of the hypothesis function, since they are used to develop it. So the error bound must be based on a statistical framework that uses uniform error bounds over the class of all possible hypothesis functions that might have been developed. (This class is independent of the in-sample data.) The class-based error bounds are weaker than error bounds based on a single function or a small set of functions. So validation, which is the secondary goal of function approximation, tends to suffer under this method.

A technique called validation by inference eliminates the tradeoff between validation and generalization. Validation by inference allows all data to be used in the development of the hypothesis function while allowing computation of error bounds based on a small set of basis functions rather than a large class of functions. A prior process that uses validation by inference to obtain an error bound for a hypothesis function formed by fusion is detailed in the Provisional Application Ser. No. 60/156,676, which is hereby incorporated by reference. The prior process computes an error bound for a given hypothesis function, but it does not develop a hypothesis function. Specifically, it does not determine a hypothesis function that minimizes the error bound over a class of prospective hypothesis functions. Also, the prior method entails solving a large mathematical program, having at least as many variables as the number of out-of-sample data inputs. The mathematical program uses a discretization technique that results in a tradeoff between program size and accuracy, so a very large mathematical program is required for very accurate validation.

BRIEF SUMMARY OF THE INVENTION

Given a set of basis functions, a set of inputs, and uniform squared error bounds for the basis functions over the inputs, the process determines a hypothesis function with minimum squared error bound among hypothesis functions formed by convex combinations of the basis function outputs. The error bound is based on uniform error bounds over the set of basis functions rather than uniform error bounds over the entire class of prospective hypothesis functions. The process operates as follows.

For each basis function, the vector of outputs over the out-of-sample inputs is computed. This vector corresponds to a point in Euclidean space with a dimension for each out-of-sample example. The basis function error bound constrains the vector of target function outputs to a closed ball centered at the point. Since the basis function bounds are uniform, the target function point is constrained to the intersection of the basis function constraint balls.

Given a hypothesis function, we can infer an error bound as follows. First, produce the vector of hypothesis function outputs over the out-of-sample inputs. Then find a point in the intersection of basis function constraint balls with maximum distance from the hypothesis function point. The square of the distance is a bound on the sum of squared distances between hypothesis function and target function outputs. Divide by the number of examples to produce a mean-squared error bound for the hypothesis function.

The center of a ball of minimum radius that includes the intersection of constraint balls corresponds to the outputs of a hypothesis function with minimum error bound. The process identifies a hypothesis function with minimum error bound among those formed by convex combinations of basis function outputs. To do this, a quadratic program is used to minimize the radius over convex combinations of constraint balls. The process produces a hypothesis function with error bound at least as low as the minimum basis function error bound, since the basis functions are among the feasible solutions.

The process applies a combination of three ideas to the problem of developing a hypothesis function through fusion and computing an error bound for the hypothesis function. The first idea is to minimize an error bound as a strategy to minimize error. The second idea, called transductive inference, is to use knowledge of out-of-sample inputs to develop a hypothesis function. The third idea, called validation by inference, is to use uniform error bounds over a small set of functions to imply uniform error bounds over an entire class of functions.

DETAILED DESCRIPTION OF THE INVENTION

Figure 1:
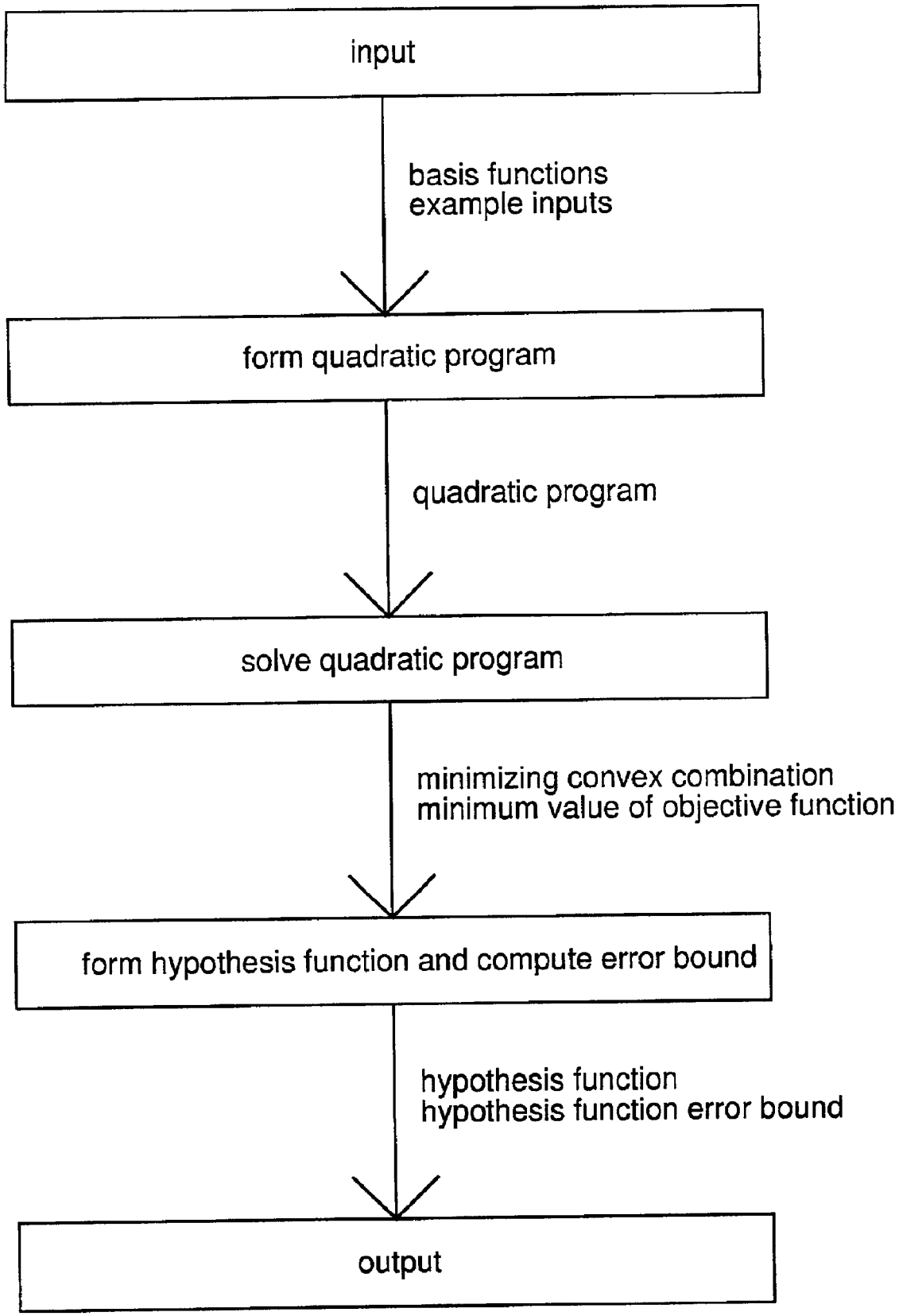
FIG. 1 is a flowchart that illustrates some steps in the process that is the invention; notes in boxes describe process steps, and notes beside arrows describe data transferred between steps.

In the first subsection we review uniform error bounds. In the next sub-section, we discuss the intuition behind the error bound minimization method. Then we present the method. We end with a discussion of methods to obtain out-of-sample inputs.

Review of Uniform Validation

Denote the basis functions by $g_1, \ldots, g_M$. Denote the target function by f. Define the error of function g over a data set as the average of the squared differences between g and f over the inputs. Assume that the squared difference over each input is no greater than t.

Let v be the error score of a basis function over the validation data, and let $v^r$ be the (unknown) error score over the out-of-sample data. Let D be the number of validation examples, and let N be the number of out-of-sample examples. Denote the negatives of the error scores on individual validation examples using random variables $X_1, \ldots, X_D$. Denote the error scores on out-of-sample examples using random variables $X_{D+1}, \ldots, X_{D+N}$. Note that $$Pr\{v' \geq v + \epsilon t\} = Pr\left\{\frac{X_1 + \ldots + X_D}{D} + \frac{X_{D+1} + \ldots + X_{D+N}}{N} \geq \epsilon t\right\}. \quad (1)$$

We will use results from the paper "Probability Inequalities for Sums of Bounded Random Variables," in the American Statistical Association Journal, 1963, pages 13 to 30, by W. Hoeffding, which is hereby incorporated in its entirety by reference. Using a result by Hoeffding from the paper, page 16, Equation 2.7, $$Pr\{v' \geq v + \epsilon t\} \leq e^{\frac{-2\epsilon^2}{(D^{-1}+N^{-1})}}. \quad (2)$$

If D=N, then we can derive a stronger and simpler result. In this case, $$Pr\{v' \geq v + \epsilon t\} = Pr\left\{\frac{X_1 + \ldots + X_{2N}}{N} \geq \epsilon t\right\}. \tag{3}$$

So $$Pr\{v' \geq v + \epsilon t\} = Pr\left\{\frac{X_1 + \ldots + X_{2N}}{2N} \geq \frac{\epsilon}{2}t\right\}. \tag{4}$$

Using another result from the paper by Hoeffding, page 16, Equation 2.6, $$Pr\{v' \geq v+\epsilon t\} \leq e^{-2N\epsilon^2}. \tag{5}$$

For the remainder of this paper, assume D=N. In practice, if D≠N, then substitute (2) for (5).

Let $v_m$ and $v_m{}^t$ represent the validation and out-of-sample error scores for basis function $g_m$. Using the sum of probabilities to bound the probability of the union event, $$Pr\{v_1{}^t \geq v_1+\epsilon t \text{ or } \ldots \text{ or } v_M{}^t \geq v_M+\epsilon t\} \leq Me^{-2N\epsilon^2}. \tag{6}$$

In other words, with probability at least $1-Me^{-2N\epsilon^2}$, for all basis functions, the out-of-sample error score is at most $\epsilon t$ greater than the validation error score. Refer to the out-of-sample error bound $v_m+\epsilon t$ as $b_m$.

Intuition

We begin with a small example. Assume we have two basis functions, $g_1$ and $g_2$, and two out-of-sample inputs, $x_1$ and $x_2$. Also, assume that we have obtained the following uniform error bounds for the basis functions.

$$Pr\left\{\forall m\in\{1,2\}|\sum_{i=1}^{2}[g_m(x_i)-f(x_i)]^2 \leq 4\right\} \geq 0.90. \tag{7}$$

In other words, with at least 90% probability, the sum of squared errors is 4 or less for both basis functions. Finally, assume that $g_1(x_1)=0$, $g_1(x_2)=0$, $g_2(x_1)=3$, and $g_2(x_2)=0$.

The error bound for $g_1$ implies that $(f(x_1), f(x_2))$ is constrained to the closed disk of radius 2 centered at (0, 0):

$$f(x_1)^2+f(x_2)^2 \leq 4. \tag{8}$$

The error bound for $g_2$ implies that $(f(x_1), f(x_2))$ is constrained to the closed disk of radius 2 centered at (3, 0):

$$[f(x_1)-3]^2+f(x_2)^2 \leq 4. \tag{9}$$

The uniform bounds imply that $(f(x_1), f(x_2))$ is in the intersection of these disks.

For any pair of hypothesis function values $(h(x_1), h(x_2))$, the sum of squared differences between the hypothesis function and the target function can be no greater than the square of the maximum distance from the hypothesis function point to a point in the intersection of basis function constraint disks. Dividing this squared distance by two gives an error bound for the hypothesis function. The hypothesis function outputs that minimize the error bound correspond to the center of the minimum radius disk that covers the intersection of the constraint disks. (The center of this hypothesis function disk minimizes the maximum distance to a point in the intersection.)

To find the minimizing hypothesis function outputs and minimum error bound for our example, let $y_1=f(x_1)$ and $y_2=f(x_2)$. Then the constraint disks can be written as follows.

$$y_1^2+y_2^2-4 \leq 0 \text{ and } (y_1-3)^2+y_2^2-4 \leq 0 \tag{10}$$

Any point that is in the intersection satisfies both constraints, so it also satisfies any convex combination of the constraints:

$$(1-\theta)[y_1^2+y_2^2-4]+\theta[(y_1-3)^2+y_2^2-4] \leq 0 \tag{11}$$

where $\theta\in[0, 1]$.

For each value of $\theta$, the convex combination corresponds to a disk constraint. To see this, rewrite the convex combination in constraint disk form. First, expand the square and collect terms.

$$(y_1^2-6\theta y_1+9\theta)+y_2^2-4 \leq 0. \tag{12}$$

Now complete the square.

$$(y_1^2-6\theta y_1+9\theta^2)+(9\theta-9\theta^2)+y_2^2-4 \leq 0. \tag{13}$$

The constraint disk is $$(y_1-3\theta)^2+y_2^2-[4-9\theta(1-\theta)] \leq 0. \tag{14}$$

The center of the disk is $(3\theta, 0)$. The square of the radius is $4-9\theta(1-\theta)$, which is minimum when $\theta=\frac{1}{2}$. So the hypothesis function values with minimum error bound are $(h(x_1), h(x_2))=(\frac{3}{2}, 0)$; the error bound is $\frac{7}{4}\cdot\frac{1}{2}$ and the minimizing hypothesis function is $\frac{1}{2}g_1+\frac{1}{2}g_2$.

In general, there are N out-of-sample inputs $x_1, \ldots, x_N$ and M basis functions $g_1, \ldots g_M$. In $R^N$, the bound for basis function g is ball with radius equal to the square root of the bound on the sum of squared differences between g and the target function f. Uniform basis function bounds imply that the target function values $(f(x_1), \ldots, f(x_N))$ are constrained to the intersection of the basis function balls. Hence, for a hypothesis function h, the distance from $(h(x_1), \ldots, h(x_N))$ to the most distant point in the intersection implies an error bound for the hypothesis function. The hypothesis function values that minimize this bound correspond to the center of the radius of the minimum-radius ball that contains the intersection.

Algorithm

For $m\in\{1, \ldots, M\}$ and $n\in\{1, \ldots, N\}$, let $y_n=f(x_n)$; let $c_{mn}=g_m(x_n)$, and let $r_m^2$ denote the bound on the sum of squared errors for $g_m$. For each basis function $g_m$, the constraint inequality is $$\sum_{n=1}^{N}(y_n-c_{mn})^2-r_m^2 \leq 0. \tag{15}$$

Each point in the intersection of the basis function constraint balls satisfies the following convex combination of basis function constraint inequalities.

$$\sum_{m=1}^{M}\theta_m\left[\sum_{n=1}^{N}(y_n-c_{mn})^2-r_m^2\right] \leq 0, \tag{16}$$

where $\theta \geq 0$ and $\theta_1+\ldots+\theta_M=1$.

Rewrite the convex combination of constraint balls as a single constraint ball with center $(c_1, \ldots, c_N)$ and radius r:

$$\sum_{n=1}^{N}(y_n - c_n)^2 - r^2 \le 0. \tag{17}$$

To do this, first expand the squares in Expression 16.

$$\sum_{m=1}^{M} \theta_m \left[ \sum_{n=1}^{N}(y_n^2 - 2c_{mn}y_n + c_{mn}^2) - \tau_m^2 \right] \le 0. \tag{18}$$

Reverse the order of summation.

$$\sum_{n=1}^{N} \left[ y_n^2 - 2\left(\sum_{m=1}^{M} \theta_m c_{mn}\right) y_n + \sum_{m=1}^{M} \theta_m c_{mn}^2 \right] - \sum_{m=1}^{M} \theta_m \tau_m^2 \le 0. \tag{19}$$

Let $$c_n = \sum_{m=1}^{M} \theta_m c_{mn}. \tag{20}$$

Then we have $$\sum_{n=1}^{N}[y_n^2 - 2c_n y_n] + \sum_{n=1}^{N}\sum_{m=1}^{M} \theta_m c_{mn}^2 - \sum_{m=1}^{M} \theta_m \tau_m^2 \le 0. \tag{21}$$

Complete the squares.

$$\sum_{n=1}^{N}[y_n^2 - 2c_n y_n + c_n^2] - \sum_{n=1}^{N} c_n^2 + \sum_{n=1}^{N}\sum_{m=1}^{M} \theta_m c_{mn}^2 - \sum_{m=1}^{M} \theta_m \tau_m^2 \le 0. \tag{22}$$

Collect terms and expand $c_n^2$ to get $$\sum_{n=1}^{N}(y_n - c_n)^2 - \sum_{n=1}^{N}\left(\sum_{m=1}^{M} \theta_m c_{mn}\right)^2 + \sum_{n=1}^{N}\sum_{m=1}^{M} \theta_m c_{mn}^2 - \sum_{m=1}^{M} \theta_m \tau_m^2 \le 0. \tag{23}$$

By pattern-matching with Expression 17, $$r^2 = \sum_{m=1}^{M} \theta_m \tau_m^2 + \sum_{n=1}^{N} \left[ \left(\sum_{m=1}^{M} \theta_m c_{mn}\right)^2 - \sum_{m=1}^{M} \theta_m c_{mn}^2 \right]. \tag{24}$$

Our goal is to find the convex combination θ that minimizes $r^2$. Note that $r^2$ is quadratic in θ and that the quadratic part is positive semidefinite. So we may use quadratic programming. Written in standard form, the quadratic program is:

minimize $\theta'A\theta + b'\theta$ (25)

subject to $\theta_1 + \ldots + \theta_M = 1$ and $\theta \ge 0$, (26)

where A is an M×M matrix with $$a_{ij} = \sum_{n=1}^{N} c_{in} c_{nj}, \tag{27}$$

and b is an M-vector with $$b_i = r_i^2 - \sum_{n=1}^{N} c_{in}^2. \tag{28}$$

Denote the solution by $\hat{r}^2$ and the minimizing convex combination by $\hat{\theta}$. Then the minimum radius ball that includes the intersection of basis function constraint balls (and has a center that is a convex combination of constraint ball centers) has radius $\hat{r}^2$ and center given by Equation 20:

$$\hat{c} = \left(\sum_{m=1}^{M} \hat{\theta}_m c_{m1}, \ldots, \sum_{m=1}^{M} \hat{\theta}_m c_{mN}\right). \tag{29}$$

Equivalently, the minimum inferred bound on the sum of squared errors is $\hat{r}^2$, and the minimizing hypothesis function is $$h = \hat{\theta}_1 g_1 + \ldots + \hat{\theta}_M g_M. \tag{30}$$

To recap, the steps of the algorithm are as follows.
1. Form the quadratic program of Equations 25, 26, 27, and 28. This is a quadratic program with variables corresponding to convex combination weights, with constraints based on basis function outputs and basis function error bounds over the out-of-sample inputs, and with an objective function corresponding to an error bound for the function formed by a convex combination of basis function outputs.
2. Solve the quadratic program to determine a minimizing convex combination and a minimum of the objective function.
3. Form the hypothesis function by using the minimizing convex combination as weights on the basis function outputs.
4. Return the minimum of the objective function as a bound on the sum of squared errors for the hypothesis function over the out-of-sample inputs.

Obtaining Out-Of-Sample Inputs

The invention detailed here uses out-of-sample inputs, i.e., inputs drawn according to the input distribution and not used to develop the basis functions. In some cases, the out-of-sample inputs are available directly before basis function training begins. In other cases, a means of producing out-of-sample inputs according to the input distribution is available. In yet other cases, an option is to collect a set of inputs to which the hypothesis function is to be applied, use the set as the out-of-sample inputs to develop the hypothesis function, and then apply the hypothesis function to those inputs. Examples of the first two cases follow.

An example of some out-of-sample inputs being available directly is as follows. Suppose there is a database containing information on patients having a condition. There is a new drug available for the condition. Various tests have been performed to determine the relationship between data about a patient and how much the drug will help the patient. Each test was performed on a set of patients chosen at random from the database, and each test yielded a basis function. In this case, the data for the set of patients who, were not chosen for tests is an available set of out-of-sample inputs.

An example of having a means of producing out-of-sample inputs according to the input distribution is as follows. Suppose the goal is to develop a hypothesis function that is the brake pressure applied by a safe driver in response to situations depicted in images from a video camera mounted on a car. Then a method to obtain out-of-sample inputs is to collect images while a safe driver drives the car in the same sorts of environments and conditions as those in which the hypothesis function will be used.

I claim:

1. A method to determine a hypothesis function with minimum squared error bound among hypothesis functions formed by convex combinations of the basis function outputs; given a set of basis functions, a set of inputs, and uniform squared error bounds for the basis functions over the inputs; the method comprising forming a quadratic program with variables corresponding to convex combination weights, with constraints based on basis function outputs and basis function error bounds over the inputs, and with an objective function corresponding to an error bound for the function formed by a convex combination of basis function outputs, and solving the quadratic program to determine a minimizing convex combination and a minimum of the objective function.

2. The method of claim 1, with the additional step of forming the hypothesis function by using the minimizing convex combination as weights on the basis function outputs.

3. The method of claim 1, with the additional step of returning the minimum of the objective function as a bound on the sum of squared errors for the hypothesis function over the inputs.

4. The method of claim 1, implemented using a general purpose computer.

* * * * *